(12) United States Patent
Neugebauer et al.

(10) Patent No.: US 9,285,530 B2
(45) Date of Patent: Mar. 15, 2016

(54) PLANAR FRONT ILLUMINATION SYSTEM HAVING A LIGHT GUIDE WITH MICRO LENSES FORMED THEREON AND METHOD OF MANUFACTURING THE SAME

(75) Inventors: Charles Neugebauer, Los Altos, CA (US); Jason Wong, Millbrae, CA (US); Sam Niansheng Qiu, Palo Alto, CA (US); David Klawon, Tucson, AZ (US)

(73) Assignee: NOOK DIGITAL, LLC, New York, NY (US)

( * ) Notice: Subject to any disclaimer, the term of this patent is extended or adjusted under 35 U.S.C. 154(b) by 0 days.

(21) Appl. No.: 13/588,945

(22) Filed: Aug. 17, 2012

(65) Prior Publication Data
US 2013/0063969 A1 Mar. 14, 2013

Related U.S. Application Data

(60) Provisional application No. 61/525,641, filed on Aug. 19, 2011.

(51) Int. Cl.
*F21V 7/04* (2006.01)
*F21V 8/00* (2006.01)

(52) U.S. Cl.
CPC .............. *G02B 6/0036* (2013.01); *G02B 6/005* (2013.01); *Y10T 29/49826* (2015.01)

(58) Field of Classification Search
CPC ...... G02B 6/0036; G02B 6/005; G02B 6/003; Y10T 29/49826
USPC ......... 362/600, 603, 608, 609, 611, 615, 616, 362/623–625; 349/63; 345/176
See application file for complete search history.

(56) References Cited

U.S. PATENT DOCUMENTS

| 4,373,282 | A | 2/1983 | Wragg | 40/546 |
|---|---|---|---|---|
| 6,108,059 | A * | 8/2000 | Yang | 349/65 |
| 6,266,108 | B1 | 7/2001 | Bao et al. | 349/63 |
| 6,340,999 | B1 * | 1/2002 | Masuda et al. | 349/63 |

(Continued)

FOREIGN PATENT DOCUMENTS

| CN | 1454329 A | 11/2003 |
|---|---|---|
| CN | 1637517 A | 7/2005 |

(Continued)

OTHER PUBLICATIONS

English Translation of Office Action from ROC (Taiwan) Pat. Appln. No. 101130061.

(Continued)

*Primary Examiner* — Diane Lee
*Assistant Examiner* — Naomi M Wolford
(74) *Attorney, Agent, or Firm* — Winston & Strawn LLP

(57) ABSTRACT

A system for illuminating a reflective display or other material from a planar front device and a method of manufacture thereof. The system includes a light guide plate that conducts light from an edge light source across the face of a reflective display. Micro lenses are formed on the inner or outer surface of the light guide and direct the light conducted in the light guide toward the display. A stepped index layer is formed on the surface of light guide plate containing the micro lenses. The stepped index layer has an index of refraction lower than an index of refraction of the light guide plate to assist in the total internal reflection of light injected into the light guide plate. A top layer protective coat or touch screen can be laminated to the outside of the light guide plate.

30 Claims, 4 Drawing Sheets

(56) References Cited

U.S. PATENT DOCUMENTS

| | | | |
|---|---|---|---|
| 6,379,017 B2 | 4/2002 | Nakabayashi et al. | 362/31 |
| 6,742,907 B2 | 6/2004 | Funamoto et al. | |
| 6,866,393 B2 * | 3/2005 | Yano et al. | 362/600 |
| 6,879,354 B1 | 4/2005 | Sawayama et al. | 349/63 |
| 6,975,455 B1 | 12/2005 | Kotchick et al. | |
| 7,001,606 B2 | 2/2006 | Schmidt et al. | 424/405 |
| 7,108,414 B2 * | 9/2006 | McCollum et al. | 362/604 |
| 7,245,335 B2 * | 7/2007 | Watanabe | 349/64 |
| 7,253,809 B2 | 8/2007 | Boyd et al. | 345/176 |
| 7,566,156 B2 * | 7/2009 | Hasei et al. | 362/558 |
| 7,864,395 B2 | 1/2011 | Chui | |
| 2005/0072032 A1 | 4/2005 | McCollum et al. | |
| 2005/0140879 A1 | 6/2005 | Nam | |
| 2006/0262568 A1 * | 11/2006 | Blom et al. | 362/625 |
| 2008/0013013 A1 * | 1/2008 | Kim et al. | 349/63 |
| 2010/0014027 A1 * | 1/2010 | Li et al. | 349/65 |
| 2010/0157406 A1 | 6/2010 | Gruhlke et al. | |
| 2011/0227487 A1 | 9/2011 | Nichol et al. | |
| 2013/0063967 A1 * | 3/2013 | Luo et al. | 362/603 |
| 2013/0063968 A1 | 3/2013 | Neugebauer et al. | |

FOREIGN PATENT DOCUMENTS

| | | | |
|---|---|---|---|
| TW | M265634 U | 5/2005 | |
| TW | 201109797 A | 3/2011 | |
| WO | WO 9963394 A1 * | 12/1999 | G02F 1/1335 |

OTHER PUBLICATIONS

English Translation of Office Action from ROC (Taiwan) Pat. Appln. No. 101130060.

* cited by examiner

PLANAR FRONT ILLUMINATION SYSTEM HAVING A LIGHT GUIDE WITH MICRO LENSES FORMED THEREON AND METHOD OF MANUFACTURING THE SAME

CROSS-REFERENCE TO RELATED APPLICATION

This application claims benefit of U.S. Provisional Application No. 61/525,641, filed Aug. 19, 2011, which is hereby incorporated by reference.

FIELD OF THE INVENTION

The present invention generally relates to planar front illumination systems for the illumination of reflective materials and displays, and more particularly to a light guide plate that conducts light from an edge light source across the face of a reflective display.

BACKGROUND OF THE INVENTION

In contrast to backlit displays (e.g., a backlit transmissive Liquid Crystal Display, LCD), where light is projected through one or more filters or shutters to create an observable image, a reflective display (e.g., an electrophoretic display, EPD) relies on light reflected off of a reflective surface to generate an image. Typically, reflective displays make use of the ambient light present in the environment where the display is used. Planar front illumination systems have been used for many years to augment the ambient light so that reflective displays can be used in darker environments. Typical planar front light illumination systems are made of clear materials and are attached to the front of reflective electronic displays. Front lights provide supplemental illumination to the face of the display when the reflected ambient light is insufficient to create an observable image.

An ideal front light illumination system would be able to efficiently and uniformly direct the light from a supplemental light source toward the display while not emitting stray light toward the environment or user. This ideal front light illumination system passes all of the reflected light to the user without optical loss or optical artifacts. Further, such an ideal front illumination system would be unobtrusive under ambient lighting, i.e., maintaining the contrast, brightness and image quality of the underlying display. In addition, such an ideal front light is also low cost, thin, lightweight, easily manufactured, compatible with touch technologies and widely available.

One common type of front light illumination system includes a light guide plate constructed with numerous microscopic optical surface features. Each of these optical surface features incrementally redirects a small portion of the light inside the light guide plate using reflection or refraction. Ideally, these optical surfaces extract and distribute the luminous flux within the light guide plate uniformly over the surface of the reflective display. To achieve reflection or refraction without mirrored surfaces (which would be costly and/or difficult to produce), optical engineers carefully construct the critical features and angles of the micro optical surface features to reliably and predictably reflect or refract despite the often poor collimation (i.e., the wide distribution of ray angles) of the source illuminators (e.g., LEDs or fluorescent tubes). The refractive and reflective feature of an optical interface is strongly dependent on the relative indices of refraction of the materials on either side of the interface. To maximize the reflective and refractive power of these micro optical features, the micro optical features are usually exposed directly to air to maximize the refractive index difference.

FIG. 1 shows a front illumination system with microscopic optical surface features. This system comprises a reflective display 100, a light source 101 and a light guide plate 102. The light guide plate has optical features 103 formed on the outer facing surface of the front illumination system. The light source 101 is typically comprised of one or more cold cathode fluorescent lights (CCFLs) or one or more LEDs suitably arranged to produce moderately collimated light 104 directed into a light injection surface of the light guide plate 102.

Common additional features known in the art (not shown) include a reflective housing for the light source, surface treatments on the light source 101 and the injection area of the light guide plate 102, and films or mixing plates inserted between the light source 101 and light guide plate 102 that improve coupling efficiency, uniformity, manufacturability, optical performance and cost. Such additions are applicable to the present invention as well to achieve similar advantageous effects.

The light guide plate 102 has nominally coplanar light guiding surfaces (top and bottom of 102 in FIG. 1). A substantial portion of the light 104 injected into light guide plate 102 remains within the light guide plate 102 due to the well-known optical effect of total internal reflection (TIR). Light guide plate 102 has a plurality of micro optic features 103 on its outer surface that redirect a portion of the guided rays 107 downward at each micro optic feature 103. Ideally, the injected light 104 is uniformly redirected and distributed across the entire surface of the reflective display 100. To achieve uniformity, the density, height, angle, pitch and shape of the micro optic features 103 and the thickness or shape of the light guide plate 102 is modulated across the breadth and width of the light guide plate 102 to account for the diminished light flux as a function of distance from the light source 101.

The incrementally redirected light 107 illuminates the reflective display 100 creating reflected rays 109 that can be seen by a user (the user, not shown, is above the front illumination systems as illustrated herein).

A typical front illumination system is usually only activated when the ambient light 108 falling on the display from external sources is insufficient for the user to perceive an image from the reflective display 100. When ambient illumination 108 is strong enough and consequently the front illumination source is not needed, the front illumination system should be as unobtrusive as possible. Specifically, the front light system should not create unusual reflections, image artifacts or stray light paths that degrade the appearance of the underlying display.

FIG. 2 shows a prior art back illumination system comprising a transmissive display 200, a light source 201 and a light guide plate 202. Light guide plate 202 has printed white dots 203 on the outer surface farthest from the display 200. The light source 200 injects light 204 into the light guide plate 202, which is then substantially guided by total internal reflection in a lateral direction in the light guide plate 202. A plurality of small white dots 203 is screen or inkjet printed, etched, stamped, burned, or molded (among the many conventional methods well known in the art of backlight design) on the outer surface of the light guide plate 202 to act as scattering centers that redirect the guided light in a diffuse scattering pattern 207 towards the transmissive display 200 and ultimately toward the viewer (ray 209). The density, color, scattering effects and/or sizes of the dots 203 is conventionally varied as a function of position to account for non-uniformity of the light source and to compensate for the consumption of guided light flux as a function of distance from the light source 201. As is known in the art, additional films 208 are conventionally placed between the back light and the transmissive display (e.g. diffusers and light redirecting films, polarization recycling films, etc.) to improve the optical efficiency, contrast, viewing angle and uniformity of the overall display.

The refractive and reflective feature of an optical interface between two clear materials (e.g. plastic and air) is strongly dependent on the relative indices of refraction of the materials on either side of the interface. To optimize the light guiding (via total internal reflection) and light extraction (via scattering, reflection or refraction) behaviors, the micro optical features are usually exposed directly to air to maximize the refractive index difference.

SUMMARY OF THE INVENTION

The front illumination systems of the prior art that rely on air interfaces, while improving the refracting and reflecting effects, create a number of substantial difficulties that are solved by the present invention. First, air gaps between optical elements over a wide area are difficult to mechanically construct while maintaining thinness and optical quality. If the front illumination system is integrated with a touch panel function, the front face must be sufficiently rigid so that it can maintain the air gap under worst case user finger pressure. Air gaps, due to the high relative index of refraction change, also can create substantial unwanted reflections unless costly anti-reflection coatings are used at each interface.

Second, if air gaps are formed on films that are subsequently laminated to a light guide plate (i.e., an embedded air gap), these air gaps are difficult to control in production as the lamination adhesive can be displaced into the air gaps or grooves, modifying the behavior of the light extraction phenomena and creating uniformity problems. An inherent tradeoff in adhesion strength versus optical quality and feature size is introduced that may not provide satisfactory solutions. Furthermore, air pressure and humidity vary widely (sometimes quickly, e.g., on an aircraft) and condensation, contamination and pressure related effects (if sealed) can create engineering, production and user difficulties.

Further, since the source light is usually poorly collimated, stray light leakage can be inadvertently directed toward the viewer, significantly increasing the brightness of the black level and thus degrading contrast. Such stray light leakage, even if not directed to the viewer, e.g., if exported at a highly acute angle from the front surface of the display system, can still result in poor electro-optical efficiency, which can negatively impact the battery life of mobile devices.

Additionally, controlling the quality of the micro optical features created in a molding process can be challenging as the light guide plate is made thinner and lighter.

Another concern associated with the prior art systems is that mechanical damage, e.g., scratches, may extract light from the light guide plate causing them to be especially highlighted when the front light is activated. Additional mechanical barriers between the light guide plate and the user are often required to prevent scratch highlighting, increasing thickness of the front illumination system and degrading optical performance of the display system.

Front light illumination system design forces a number of compromises where optical design goals, e.g. minimizing ambient reflections and image artifacts. are optimized at the expense of some other constraints, e.g., the cost of anti-reflection coatings and thickness of the system.

The front illumination system of the present invention addresses a number of the aforementioned limitations and forced compromises in the art, enabling a fully laminated, thin, light, economical, uniform, mechanically robust, efficient, highly transparent, low artifact, low leakage front illumination system.

The system of the present invention includes a light guide plate that conducts light from an edge light source across the face of a reflective display. Micro lenses are formed on the inner or outer surface of the light guide. The micro lenses direct the light conducted in the light guide toward the display. A layer having a lower index of refraction is formed on the surface of the light guide plate having the micro lenses. This layer is also known as a stepped index layer and assists in substantially confining the injected light in the light guide plate by total internal reflection. This structural configuration provides a fully laminated front illumination system with a buried light guide layer. In a preferred embodiment, the micro lenses are formed as concave or convex structures in or on the surface of the light guide plate. In another embodiment, a touch screen can be laminated inside protective layers either above or below the light guide plate.

The planar front illumination system of the present invention can be fully laminated with no air gaps and no air pockets in order to maximize ruggedness and minimize internal surface reflections that can degrade optical performance. The system simplifies integration of reflective displays with touch sensor. The system is thin and light. The system maximizes the light directed inward toward the display while minimizing stray light in all other directions. The system generates substantially uniform illumination over a large area and minimizes display and illumination related artifacts such as Moire, ghosting and pressure sensitivity. The system is efficiently and inexpensively produced.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The following abbreviations are utilized in the following description, which are intended to have the meanings provided as follows:
CCFL—cold cathode fluorescent light
EPD—electrophoretic display
LCD—liquid crystal display
LGP—light guide plate
LED—light emitting diode
OCA—optically clear adhesive
OLED—organic light emitting diode
PC—polycarbonate
PET—polyethylene terephthalate
PMMA—poly methyl methacrylate
TIR—total internal reflection.

Figure 1:
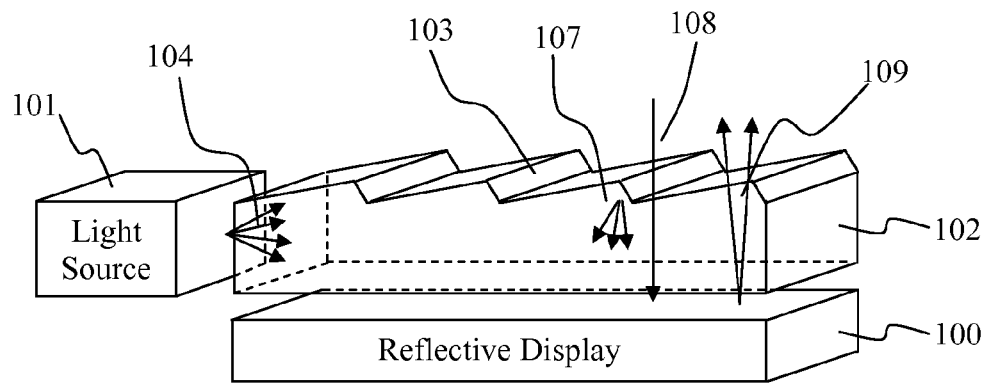
FIG. 1 depicts a prior art front illumination system for a reflective display with micro optic features on the front face of a light guide plate.
Figure 2:
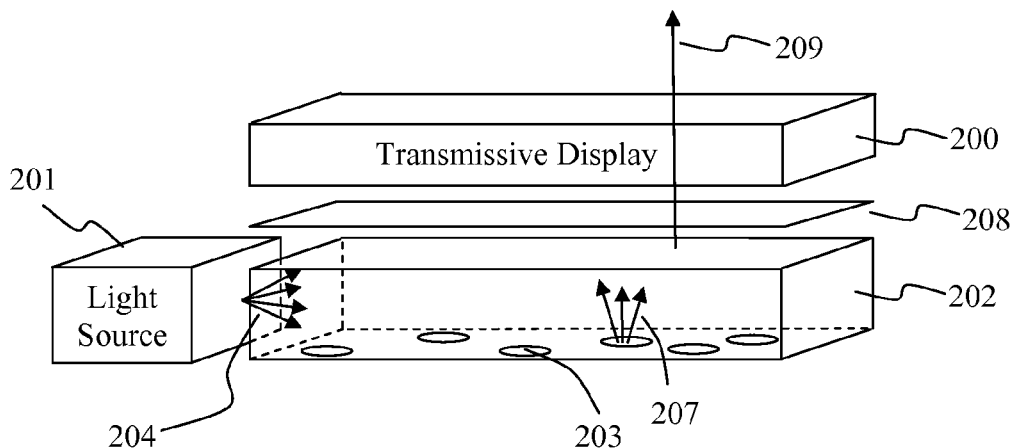
FIG. 2 illustrates a prior art back illumination system for a transmissive display utilizing a printed dot pattern light guide plate.
Figure 3:
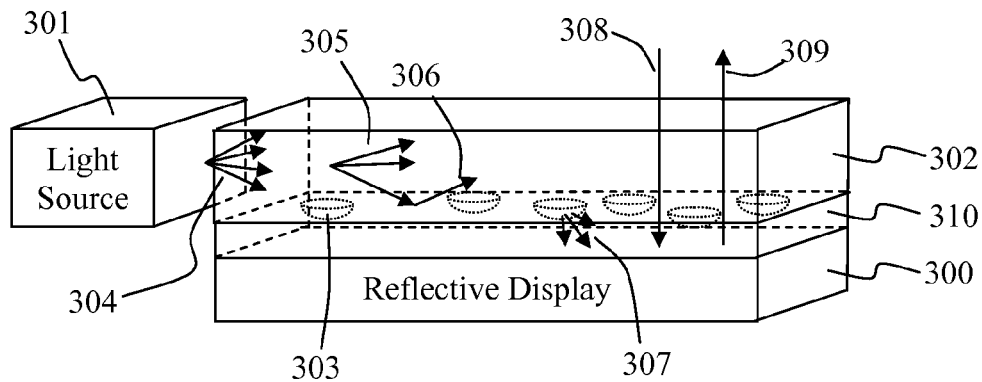
FIG. 3 illustrates a planar front illumination system of the present invention with convex micro lenses formed on the inner face of a light guide plate.

FIG. 3 illustrates an embodiment of the present invention including a reflective display or material 300, a light source 301 and a light guide plate 302. A plurality of convex micro lenses 303 is formed on the inner surface of the light guide plate 302, the surface closest to the reflective display 300. The light source 301 and light guide plate 302 are coupled as is well known in the art to achieve efficient, uniform and reproducible light injection 304 into the light guide plate 302. Laterally propagating rays 305 are confined within the light guide plate 302 by, in part, the TIR effect 306 from the inner surface of the light guide plate 302 at the interface to a stepped index layer 310. The stepped index layer 310 has an index of refraction that is lower than that of the light guide plate 302. In a preferred embodiment, the stepped index layer 310 is a clear adhesive layer that has a lower index of refraction than the light guide plate 302 in order to support total light guiding by TIR. The outer optical interface of the light guide plate 302 in the embodiment illustrated in FIG. 3 is to air (above plate 302 in FIG. 3). This interface also provides for TIR of guided rays 305. Although air can be used as the stepped index layer, it is preferred to use some other material, such as the above described clear adhesive layer.

The term "stepped index" is borrowed from the fiber optic technology and is distinguished from other indexes such as "graded index" fiber which has a smooth index peak that confines a single mode in order to keep propagation speed very uniform). In a fiber structure, a cylindrical inner core of high index material is cladded with a lower index material to achieve TIR for light propagating down the length of the cylinder. In contrast to the use in fiber structures, the present invention uses its stepped index layer to confining light in only one dimension and leaves the light to freely propagate freely in the other two dimensions. In a fiber, the light is confined in two dimensions and can freely propagate in only one dimension.

Micro lenses 303 formed on the light guide plate 302 perform a light extraction function in which a portion of the incident guided rays 305 are refracted and/or reflected 307 toward the reflective display 300. The reflective display 300 reflects the extracted light 307 and incident ambient light 308 toward the viewer (not shown) as rays 309. These reflected rays 309 pass through the light guide plate 302, optical adhesive layer 310 and micro lenses 303 with only small reflection and refraction effects.

In one embodiment of the present invention, the areal density of the micro lenses 303, with respect to the surface area of the surface of light guide plate 302, is varied within the light guide plate 302 to compensate for light source nonuniformity and variations in the optical flux in the light guide plate 302 as a function of position in order to present a substantially uniform light source to the display. In a preferred embodiment of the present invention, the density of the micro lenses 303 is increased farther from the light source 301 to achieve a more uniform flux 307 over the length of light guide plate 302. In a further embodiment, the micro lens 303 density is adjusted near edges of the light guide plate 302 to account for side and opposing surface reflections and optical losses in order to achieve a more uniform extracted light field 307. The areal density of the micro lenses 303 can range from near zero, <1% by area, to very high, nearly 100%, depending on the non-uniformity of the light flux and the extraction efficiency of the micro lenses 303.

The density of the micro lenses 303 can be simulated to get an initial areal density, and then empirically tuned during the manufacturing process, e.g., fabricating a light guide plate 302 with a specific areal density of micro lenses 303, measuring the uniformity of the light on the display 300 and repeating this process, changing the density over many cycles to optimize the uniformity of the light flux In a further embodiment of the present invention, the area of each micro lens 303 is kept substantially smaller than the underlying reflective display 300 unit pixel area so that the micro lenses 303 do not objectionably distort the underlying pixels (not shown in FIG. 3).

In a further embodiment of the present invention, the height and profile of each micro lens 303 is engineered, e.g., by making substantially microscopically smooth edges and profile transitions, to allow the optical adhesive 310 to uniformly coat and fill all spaces around micro lenses 303 to prevent microscopic air bubbles from being trapped or forming after some post-manufacturing environmental exposure, e.g., exposure to low external air pressure at high altitudes, heat and/or humidity.

In a further embodiment, the convex shape of micro lenses 303 is tuned to the refractive indices of the light guide plate 302 and the optically clear adhesive layer 310 to optimize uniformity of the extracted light, manufacturing yield, tooling complexity and material cost by making the optical reflection and refractive effects insensitive to manufacturing and material variations.

In a further embodiment, the micro lenses 303 are made sufficiently small e.g., 50 microns or less, and spaced sufficiently closely together and sufficiently elevated above the image plane of display 300 so that the extracted light 307 reaching the display 300 image plane is substantially spatially uniform.

In a still further embodiment, the micro lenses 303 are designed to minimize direct reflection from ambient illumination 308 and to minimize distortion of the reflected image 309 through refraction by, for example, constraining the maximum angle of the micro lenses 303 relative to the light guide plate 302. The micro lens 303 shape, micro lens 303 edge geometry, OCA 310 index of refraction, and OCA 310 softness, i.e., the ability to flow around the micro lens 303 shape, contribute to the contrast, brightness, clarity, and overall optical performance of he combined display system. By balancing the multiple demands on the micro lens 303 shape in accordance with the present teachings, one skilled in the art can minimize the perceived degradation of the reflective display 300 performance, e.g., contrast, brightness, clarity, caused by the front illumination system of the present invention.

A large number of materials are available for constructing the present invention. Light guides 302 typically have substantially flat surfaces and are commonly constructed of PMMA or PC plastic, although any optically clear material, e.g., glass, with an index of refraction that is higher than the surrounding material, e.g., air or vacuum above and the OCA 310 below the light guide plate 302 in FIG. 3. Similarly, the light source 301 can assume many forms and be made from many materials. For example a CCFL, an OLED or one or more LED lamps coupled to a light bar or mixing plate may be used within the present teachings as the light source 301. One or more sides of the light guide plate 302 may have injecting surfaces with one or more light sources 301. For simplicity, only one light source is shown in the figures but as is well known in the art, the number and positions of light sources, e.g., placed at one or more edges or corners, can be varied given system constraints on cost, light uniformity, brightness, mechanical boundaries, form factor, etc. Other light sources (e.g., incandescent lamps, lasers, vacuum fluorescent tubes) could be used.

The optical interfaces and surfaces of the components of the present invention can be coated, shaped, processed, textured or modified by the inclusion or application of specialized films so as to achieve any number of standard desirable changes in properties. These films can be used to improve light confinement, improve light guide injection uniformity, reduce stray reflections, improve light source 301 to light guide plate 302 coupling efficiency, improve light guide plate 302 to reflective display 300 interface or reduce the thickness and weight of the system. Such additions and modifications are well known in the art of illumination design and are available at the discretion of the designer to achieve the desired balance between cost, performance, yield, etc., without detracting from the scope of the present teachings.

Many options are available for fabricating micro lenses 303 on the light guide plate 302. In one embodiment, the micro lenses 303 are printed using, e.g., an industrial inkjet printer and a clear UV cured polymer ink. Such printers can directly apply small, e.g., 30 microns or less, clear polymer dots precisely, rapidly and inexpensively onto the light guide plate.

In another embodiment, micro lenses 303 can be formed on the surface of the light guide plate 302 by an injection molding process when the light guide plate 302 is manufactured. In this process, a metal mold is tooled with precise micro lens indentations and plastic is injected into the mold creating convex lenses 303 at each metal mold indentation.

Micro lenses 303 can also be hot stamped, molded, mechanically embossed, engraved, chemically etched and/or created lithographically on the light guide plate 302. Substituting such alternative techniques for creating micro lenses 303 on the inner surface of a front illumination light guide plate 302 are known to those skilled in the art and are included in the scope of the present teachings.

The exact shape of the micro lenses 303 can be substantially changed within the present teachings, e.g., circular, hemispherical, triangular, square, rectangular or oval shapes among others are all possible. In addition or in the alternative, lensing lines, segments or traces could be substituted for the round micro lenses 303 illustrated in FIG. 3.

In one embodiment of the present invention, the light guide plate 302 and the stepped index layer 310, e.g., an optically clear adhesive layer, can be manufactured as a unit, for later incorporation in the assembly of a completed device having a light source 301 and a display 300.

In an alternative embodiment, stepped index layer 310, with an index of refraction lower than the light guide plate 302 can be co-extruded with the light guide 302 to achieve both protection and light confinement by TIR within in the light guide plate 702.

Figure 4:
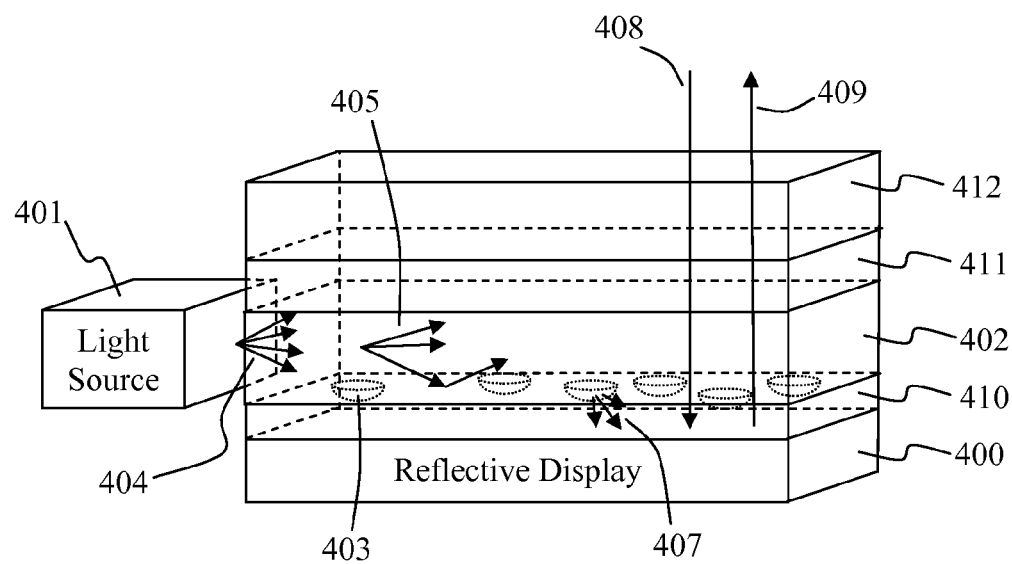
FIG. 4 depicts a planar front illumination system of the present invention with convex micro lenses formed on the inner face of a light guide plate with a laminated outer protective sheet.

FIG. 4 shows a further embodiment of the present invention comprising a reflective display or material 400, a light source 401 and a light guide plate 402. A plurality of convex micro lenses 403 is formed on the inner surface of the light guide plate 402, the surface closest to the reflective display 400. The light source 401 and light guide plate 402 are coupled as is well known in the art to achieve efficient, substantially uniform and reproducible light injection 404 into the light guide plate 402. Laterally propagating rays 405 are confined within the light guide plate 402 by a TIR effect from the inner surface of the light guide plate 402 at the interface to a stepped index layer 410. In a preferred embodiment, the stepped index layer 410 is a clear adhesive layer that has a lower index of refraction than the light guide plate 402 in order to support TIR light guiding.

An outer clear protective sheet 412 is laminated to the top of light guide plate 402 with an additional stepped index layer 411 disposed between the protective sheet 412 and the light guide plate 402. In a preferred embodiment, the stepped index layer is an optically clear adhesive layer that has a lower index of refraction than the light guide plate 402. This upper optical interface of light guide plate 402 also supports light guiding of the transversely travelling rays 405 by TIR.

In an alternative embodiment, a protective layer 412 with an index of refraction lower than the light guide plate 402 can be coextruded with the light guide plate 402 to achieve both protection and light confinement by TIR within the light guide plate 402. In this embodiment, no adhesive layer is required and the protective layer 412 acts as the stepped index layer.

The micro lenses 403 of the embodiment illustrated in FIG. 4 perform the same light extraction function as the micro lenses 303 described above with respect to FIG. 3. Further, all of the above description with respect to the manufacture and variations in the micro lenses 303 applies equally to the micro lenses 403.

Micro lenses 403 formed on the light guide plate 402 perform a light extraction function in which a portion of the incident guided rays 405 are refracted and/or reflected 407 toward the reflective display 400. The reflective display 400 reflects the extracted light 407 and incident ambient light 408 toward the viewer (not shown) as rays 409. The incident 408 and reflected rays 409 pass through the protective sheet 412, optical adhesives 410 411, light guide plate 402 and micro lenses 403 with only small reflection and refraction effects.

Figure 5:
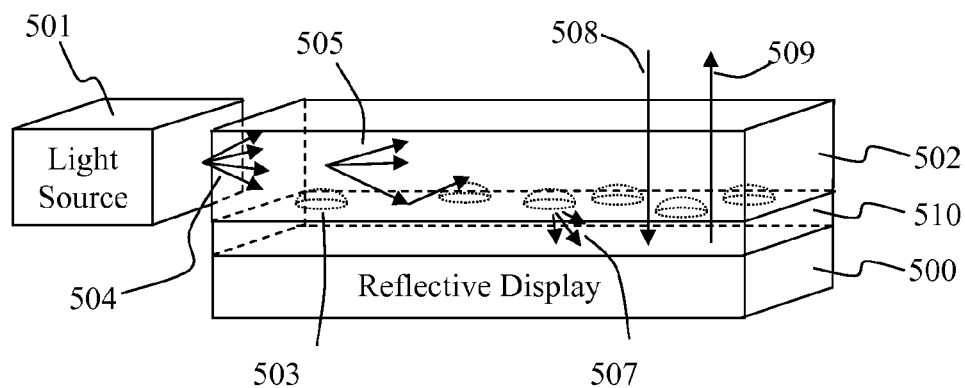
FIG. 5 illustrates a planar front illumination system of the present invention with concave micro lenses formed on the inner face of a light guide plate.

FIG. 5 shows a further embodiment of the present invention comprising a reflective display or material 500, a light source 501 and a light guide plate 502. A plurality of concave micro lenses 503 is formed on the inner surface of the light guide plate 502, the surface closest to the reflective display 500. The light source 501 and light guide plate 502 are coupled as is well known in the art to achieve efficient, substantially uniform and reproducible light injection 504 into the light guide plate 502. Laterally propagating rays 505 are confined within the light guide plate by TIR from the inner surface of the light guide plate 502 at the interface to a stepped index layer 510. In a preferred embodiment, the stepped index layer 510 is a clear adhesive layer that has a lower index of refraction than the light guide plate 502 in order to support TIR.

Micro lenses 503 on the light guide plate 502 perform a light extraction function in which a portion 507 of the incident guided rays 505 are refracted and/or reflected by the lenses 503 and are directed toward the reflective display 500. The reflective display 500 reflects the extracted light 507 and incident ambient light 508 toward the viewer (not shown) as rays 509. These reflected rays pass through the light guide plate 502, stepped index layer 510 and micro lenses 503 without substantial losses or distortions.

All of the above description with respect to the variations in the micro lenses 303 applies equally to the micro lenses 503.

Concave micro lenses 503 can be formed on the surface of the light guide plate 502 by an injection molding process when the light guide plate 502 is manufactured. In this process, a metal mold is tooled with precise micro lens bumps and plastic is injected into the mold creating concave lenses at each metal mold bump. Numerous other processes known in the art can be adapted to create concave lens shapes, including hot stamping, etching, photolithography, sandblasting, mechanical engraving or drilling and laser engraving.

Figure 6:
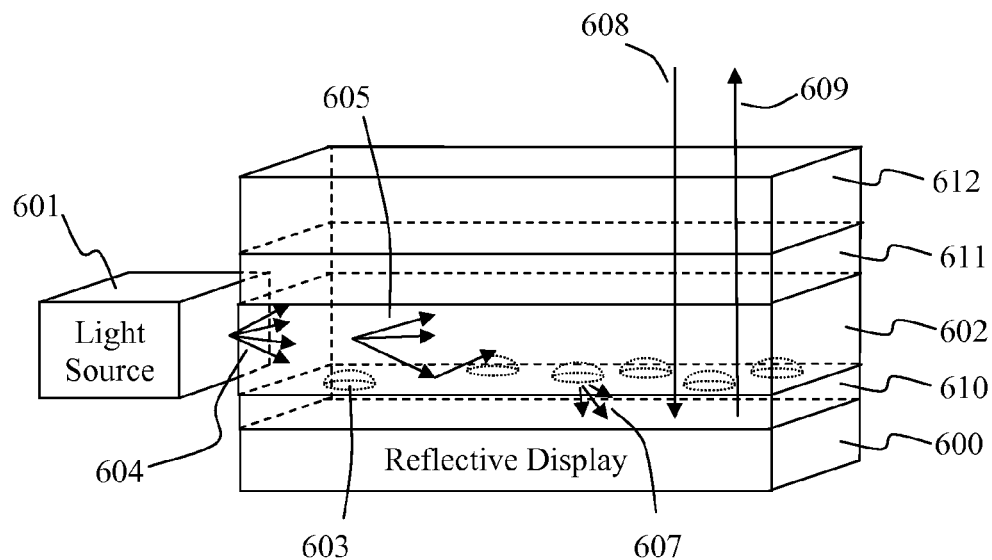
FIG. 6 depicts a planar front illumination system of the present invention with concave micro lenses formed on the inner face of a light guide plate with a laminated outer protective sheet.

FIG. 6 shows a further embodiment of the present invention comprising a reflective display or material 600, a light source 601 and a light guide plate 602. A plurality of concave micro lenses 603 is formed on the inner surface of the light guide plate 602, the surface closest to the reflective display 600. The light source 601 and light guide plate 602 are coupled as is well known in the art to achieve efficient, uniform and reproducible light injection 604 into the light guide plate 602. Laterally propagating rays 605 are confined within the light guide plate 602 by TIR from the inner surface of the light guide plate 602 at the interface to a stepped index layer 610. In a preferred embodiment, the stepped index layer 610 is a clear adhesive layer that has a lower index of refraction than the light guide plate 602 in order to support TIR light guiding. An outer clear protective sheet 612 is laminated to the light guide plate 602 with an intervening stepped index layer 611. In a preferred embodiment, stepped index layer 611 is an optically clear adhesive with a lower index of refraction than the light guide plate 602 in order to support light guiding by TIR.

In an alternative embodiment, a protective layer 612 with an index of refraction lower than the light guide plate 602 can be coextruded with the light guide plate 602 to achieve both protection and light confinement by TIR within in the light guide plate 602. In this embodiment, no adhesive layer is required and the protective layer 612 acts as the stepped index layer.

Micro lenses 603 on the light guide plate 602 perform a light extraction function as described above with respect to FIG. 5 in regard to concave micro lenses 503. Further, all of the above description with respect to the variations in the micro lenses 303 applies equally to the micro lenses 603.

Micro lenses 603 formed on the light guide plate 602 perform a light extraction function in which a portion of the incident guided rays 605 are refracted and/or reflected 607 toward the reflective display 600. The reflective display 600 reflects the extracted light 607 and incident ambient light 608 toward the viewer (not shown) as rays 609. The incident 608 and reflected rays 609 pass through the protective sheet 612, optical adhesives 610 611, light guide plate 602 and micro lenses 603 without substantial losses or distortions.

Figure 7:
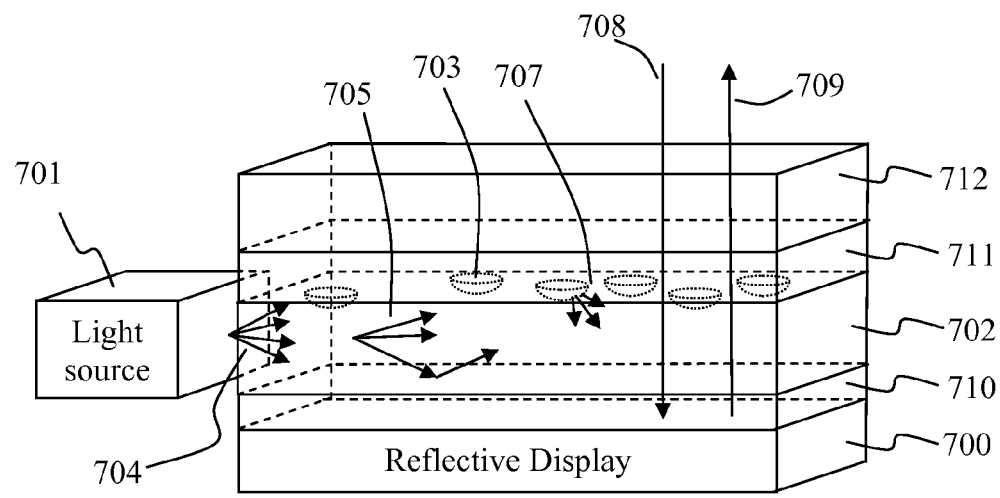
FIG. 7 depicts a planar front illumination system of the present invention with concave micro lenses formed on the outer face of a light guide plate with a laminated outer protective sheet.

FIG. 7 shows a further embodiment of the present invention comprising a reflective display or material 700, a light source 701 and a light guide plate 702. A plurality of concave micro lenses 703 is formed on the outer surface of the light guide plate 702, the surface that is farthest from the reflective display 700. The light source 701 and light guide plate 702 are coupled as is well known in the art to achieve efficient, substantially uniform and reproducible light injection 704 into the light guide plate 702. Laterally propagating rays 705 are confined within the light guide plate 702 by the TIR effect from the inner surface of the light guide plate 702 at the interface to a stepped index layer 710. In a preferred embodiment, the stepped index layer is an optically clear adhesive layer that has a lower index of refraction than the light guide plate 702 in order to support TIR light guiding.

An outer clear protective sheet 712 is laminated to the top of light guide plate 702 with an additional stepped index layer 711. In a preferred embodiment, the stepped index layer 711 is an optical adhesive layer that has a lower index of refraction than the light guide plate 702. This upper optical interface of light guide plate 702 also supports light guiding of the transversely travelling rays 705 by TIR.

In an alternative embodiment, protective layer 712 with an index of refraction lower than the Light guide plate 702 can be co-extruded with the light guide 702 to achieve both protection and light confinement by TIR within in the light guide plate 702. In this embodiment, no adhesive layer is required and the protective layer 712 acts as the stepped index layer.

Micro lenses 703 formed on the light guide plate 702 perform a light extraction function in which a portion 707 of the incident guided rays 705 are refracted and/or reflected toward the reflective display 700. The extracted rays 707 pass through the light guide 702 and the clear adhesive layer 710 to the reflective display 700. Reflective display 700 reflects the extracted light 707 and the ambient light 708 toward the viewer as rays 709. These reflected rays 709 pass through the clear areas of light guide plate 702 and micro lenses 703 with only small reflection and refraction effects.

All of the above description with respect to the manufacture of the concave micro lenses 503 and the variations in the micro lenses 303 apply equally to the micro lenses 703.

Figure 8:
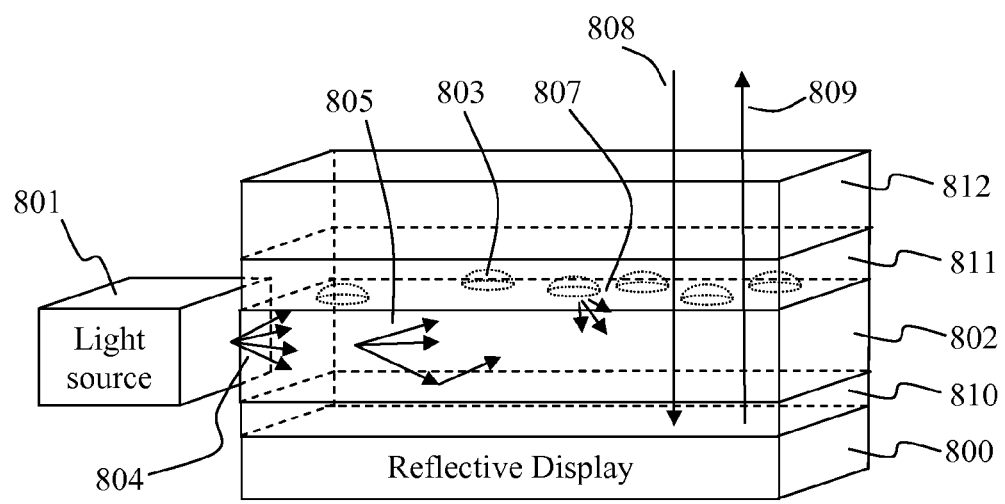
FIG. 8 illustrates a planar front illumination system of the present invention with convex micro lenses formed on the outer face of a light guide plate with a laminated outer protective sheet.

FIG. 8 shows a further embodiment of the present invention comprising a reflective display or material 800, a light source 801 and a light guide plate 802. A plurality of convex micro lenses 803 is formed on the outer surface of the light guide plate 802, the surface that is farthest from the reflective display 800. The light source 801 and light guide plate 802 are coupled as is well known in the art to achieve efficient, uniform and reproducible light injection 804 into the light guide plate 802. Laterally propagating rays 805 are confined within the light guide plate 802 by the TIR effect from the inner surface of the light guide plate 802 at the interface to a stepped index layer 810. In a preferred embodiment, the stepped index layer 810 is a clear adhesive layer that has a lower index of refraction than the light guide plate 802 in order to support TIR light guiding.

An outer clear protective sheet 812 is laminated to the top of light guide plate 802 with an additional stepped index layer 811. In a preferred embodiment, the stepped index layer 811 is an optically clear adhesive layer that preferably has a lower index of refraction than the light guide plate 802. This upper optical interface of light guide plate 802 also supports light guiding of the transversely travelling rays 805 by total internal reflection.

In an alternative embodiment, a protective layer 812 with an index of refraction lower than the light guide plate 802 can be coextruded with the light guide plate 802 to achieve both protection and light confinement by TIR within in the light guide plate 802. In this embodiment, no adhesive layer is required and the protective layer 812 acts as the stepped index layer.

Micro lenses 803 formed on the light guide plate 802 perform a light extraction function in which a portion 807 of the incident guided rays 805 are refracted or reflected toward the reflective display 800. The extracted rays 807 pass through the light guide 802 and the clear adhesive layer 810 to the reflective display 800. Reflective display 800 reflects the extracted light 807 and the incident ambient light 808 toward the viewer (not shown) as rays 809. These reflected rays 809 pass through the light guide plate 802, optical adhesives 810 811, protective sheet 812 and micro lenses 803 without substantial losses or distortions.

Further, all of the above description with respect to the manufacture and variations in the micro lenses 303 apply equally to the micro lenses 803

In the above embodiments of the present invention, the protective sheets 412, 612, 712 and 812 respectively provide a layer of mechanical separation between the light guiding layers 402, 602, 702 and 802 and the user so that mechanical marks, or surface contamination, e.g., scratches, gouges, oil, dirt, water, fingerprints, dust, etc. do not create inadvertent light extraction toward the user. Further, the protective sheets 412, 612, 712 and 812 can support additional layers and surface treatments that enhance the performance, e.g., anti-glare/haze, anti-reflection, anti-fingerprint, anti-scratch, hardcoat or other enhancements. If these additional layers are applied directly to the light guide plates 402, 602, 702 and 802, they would possibly degrade the light guide confinement performance and adversely affect contrast, brightness or other display performance criteria under ambient or front lighted conditions.

In an additional embodiment of the present invention, the light guide plates 302, 402, 502, 602, 702 and 802 are fabricated from polycarbonate with an index of refraction of approximately 1.585, and the optical adhesive layers 310, 410, 411, 510, 610, 611, 710, 711, 810 and 811 are made of a low index optical adhesive with an index of refraction between 1.32 and 1.50. In an alternative embodiment of the present invention, the light guide plates 302, 402, 502, 602, 702 and 802 are fabricated from PMMA with an index of refraction of approximately 1.49 and the optical adhesive layers 310, 410, 411, 510, 610, 61, 710, 711, 810 and 811 are made of a low index optical adhesive with an index of refraction between 1.32 and 1.45. Those skilled in the art will recognize the wide variety of light guide materials and adhesive laminating materials that can be substituted within the general framework of the present teachings to create the conditions for sufficient confinement by TIR within the light guide plates 302, 402, 502, 602, 702 and 802.

Those skilled in the art will also recognize that the protective layers 412, 612, 712 and 812 can be used as a substrate for integrating a fully laminated touch sensor onto the top of the display system. Such laminated touch sensors are well known in the art, e.g., projected capacitance, surface capacitance, and infrared, among others. The lamination of such a touch sensor as, or in addition to, the top protective layers 412, 612, 712 and 812 are within the scope of the present invention.

The light sources 301, 401, 501, 601, 701 and 801 are only shown as firing from a single edge to simplify the drawings. In practice, these light sources 301, 401, 501, 601, 701 and 801 can inject light from any or all edges and/or from one or more corners of the light guide plates 302, 402, 502, 602, 702 and 802. A string of LEDs or point light sources arranged linearly along one or more edges of the light guide plate 302, 402, 502, 602, 702 and 802 can also constitute the light source 301, 401, 501, 601, 701 and 801 within the present invention.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A front illumination device comprising:
   a light source comprising a plurality of Light Emitting Diodes, LEDs;
   a light guide plate optically coupled with the light source, wherein the plurality of LEDs are coupled to the light guide plate along at least one edge thereof;
   an electrophoretic display disposed adjacent a first surface of the light guide plate;
   an optically clear layer disposed on a second surface of the light guide plate without any substantial intervening air gaps, the second surface being opposite the first surface;
   a stepped index layer disposed between the first surface of the light guide plate and the electrophoretic display without any substantial intervening air gaps, the stepped index layer having an index of refraction lower than an index of refraction of the light guide plate; and
   a plurality of micro lenses disposed on the first surface of the light guide plate, wherein the plurality of micro lenses are substantially circular when viewed on the first surface, and wherein at least one of a spatial density, size and reflective properties of the micro lenses is varied across the first surface of the light guide plate to be capable of reflecting at least a portion of light injected by the light source substantially uniformly toward the electrophoretic display.

2. The front illumination device of claim 1, wherein the micro lenses are substantially convex in shape.

3. The front illumination device of claim 1, wherein the micro lenses are substantially concave in shape.

4. The front illumination device of claim 1, wherein the light guide plate is capable of substantially containing the injected light by total internal reflection.

5. The front illumination device of claim 1, wherein the micro lenses occupy less than approximately 5% of the area of the first surface of the light guide plate.

6. The front illumination device of claim 1, wherein the light guide plate has an index of refraction of approximately 1.585.

7. The front illumination device of claim 1, wherein each of the micro lenses has a width of approximately 50 microns or less.

8. The front illumination device of claim 1, wherein the stepped index layer has an index of refraction between approximately 1.32 and approximately 1.50.

9. The front illumination device of claim 1, wherein the stepped index layer is an optically clear adhesive layer coupling the electrophoretic display and the first surface of the light guide plate.

10. The front illumination device of claim 9, wherein the optically clear layer disposed on the second surface of the light guide plate is a second optically clear adhesive layer.

11. The front illumination device of claim 10, wherein the first and second optically clear adhesive layers each have an index of refraction between approximately 1.32 and approximately 1.50 and act as a stepped index layer to assist in substantially confining the injected light in the light guide plate by total internal reflection.

12. The front illumination device of claim 10 further comprising a protective layer disposed on the second optically clear adhesive layer.

13. The front illumination device of claim 12, wherein the protective layer is a touch sensor.

14. A front illumination device comprising:
   a light source comprising a plurality of Light Emitting Diodes, LEDs;

a light guide plate optically coupled with the light source, wherein the plurality of LEDs are coupled to the light guide plate along at least one edge thereof;

an electrophoretic display disposed adjacent a first surface of the light guide plate without any substantial intervening air gaps;

a plurality of micro lenses disposed on a second surface of the light guide plate, the second surface being opposite the first surface, wherein the plurality of micro lenses are substantially circular when viewed on the second surface, and wherein at least one of a spatial density, size and reflective properties of the micro lenses is varied across the second surface of the light guide plate; and a stepped index layer disposed on the second surface of the light guide plate without any substantial intervening air gaps, the stepped index layer having an index of refraction lower than an index of refraction of the light guide plate, wherein the light guide plate is capable of reflecting at least a portion of light injected by the light source substantially uniformly toward the electrophoretic display.

15. The front illumination device of claim 14, wherein the micro lenses are substantially convex in shape.

16. The front illumination device of claim 14, wherein the micro lenses are substantially concave in shape.

17. The front illumination device of claim 14, further comprising:

a first optically clear adhesive layer coupling the electrophoretic display and the first surface of the light guide plate without any substantial intervening air gaps, wherein the stepped index layer is a second optically clear adhesive layer.

18. The front illumination device of claim 17, wherein the first and second optically clear adhesive layers each have an index of refraction between approximately 1.32 and approximately 1.50 and act as a stepped index to assist in substantially confining the injected light in the light guide plate by total internal reflection.

19. The front illumination device of claim 17, further comprising a protective layer disposed on the second optically clear adhesive layer.

20. The front illumination device of claim 19, wherein the protective layer is a touch sensor.

21. A light guide assembly for a front illumination device comprising:

a light guide plate, the light guide plate having at least one edge for receiving light from a plurality of Light Emitting Diodes, LEDs;

a plurality of micro lenses disposed on a first surface of the light guide plate, wherein the plurality of micro lenses are substantially circular when viewed on the first surface, and wherein at least one of a spatial density, size and reflective properties of the micro lenses is varied across the first surface of the light guide plate to be capable of reflecting at least a portion of light injected by the light source substantially uniformly from the light guide plate;

an optically clear layer disposed on a second surface of the light guide plate without any substantial intervening air gaps, the second surface being opposite the first surface; and a stepped index layer disposed on the first surface of the light guide plate without any substantial intervening air gaps, the stepped index layer having an index of refraction lower than an index of refraction of the light guide plate.

22. The light guide assembly of claim 21, wherein the micro lenses are substantially convex in shape.

23. The light guide assembly of claim 21, wherein the micro lenses are substantially concave in shape.

24. The light guide assembly of claim 21, wherein the stepped index layer is an optically clear adhesive layer.

25. A method for manufacturing a front illumination device, the method comprising:

providing a light guide plate;

forming a plurality of micro lenses on a first surface of the light guide plate, wherein the plurality of micro lenses are substantially circular when viewed on the first surface, and wherein at least one of a spatial density, size and reflective properties of the micro lenses is varied across the first surface of the light guide plate to be capable of reflecting at least a portion of light injected by the light source substantially uniformly from the light guide plate;

forming an optically clear layer disposed on a second surface of the light guide plate without any substantial intervening air gaps, the second surface being opposite the first surface;

forming a stepped index layer on the first surface of the light guide plate without any substantial intervening air gaps, the stepped index layer having an index of refraction lower than an index of refraction of the light guide plate;

coupling the stepped index layer to an electrophoretic display without any substantial intervening air gaps; and coupling an edge of the light guide plate to a light source comprising a plurality of Light Emitting Diodes, LEDs.

26. The method of claim 25, further comprising forming the micro lenses in a concave shape.

27. The method of claim 25, further comprising forming the micro lenses in a convex shape.

28. A method for manufacturing a front illumination device, the method comprising:

providing a light guide plate;

forming a plurality of micro lenses on a first surface of the light guide plate, wherein the plurality of micro lenses are substantially circular when viewed on the first surface, and wherein at least one of a spatial density, size and reflective properties of the micro lenses is varied across the first surface of the light guide plate to be capable of reflecting at least a portion of light injected by the light source substantially uniformly from the light guide plate;

forming a stepped index layer on the first surface of the light guide plate without any substantial intervening air gaps, the stepped index layer having an index of refraction lower than an index of refraction of the light guide plate;

coupling a second surface of the light guide plate to an electrophoretic display without any substantial intervening air gaps, the second surface being opposite the first surface; and coupling an edge of the light guide plate to a light source comprising a plurality of Light Emitting Diodes, LEDs.

29. The method of claim 28, further comprising forming the micro lenses in a concave shape.

30. The method of claim 28, further comprising forming the micro lenses in a convex shape.

* * * * *